US00RE50995E

(19) United States
(12) Reissued Patent
Poole et al.

(10) Patent Number: US RE50,995 E
(45) Date of Reissued Patent: Aug. 18, 2026

(54) LOW GWP REFRIGERANT BLENDS

(71) Applicant: RPL Holdings Limited, Altrincham (GB)

(72) Inventors: John Edward Poole, Altrincham (GB); Richard Llewellyn Powell, York (GB)

(73) Assignee: RPL Holdings Limited, Hale Altrincham (GB)

(21) Appl. No.: 18/739,215

(22) Filed: Jun. 10, 2024

Related U.S. Patent Documents

Reissue of:
(64) Patent No.: 11,459,497
Issued: Oct. 4, 2022
Appl. No.: 16/764,347
PCT Filed: Nov. 26, 2018
PCT No.: PCT/EP2018/082583
§ 371 (c)(1),
(2) Date: May 14, 2020
PCT Pub. No.: WO2019/102003
PCT Pub. Date: May 31, 2019

(30) Foreign Application Priority Data

| | | |
|---|---|---|
| Nov. 27, 2017 | (GB) | 1719692 |
| Jan. 12, 2018 | (GB) | 1800521 |
| Apr. 6, 2018 | (GB) | 1805792 |
| Jul. 4, 2018 | (GB) | 1810959 |
| Sep. 24, 2018 | (GB) | 1815477 |
| Oct. 15, 2018 | (GB) | 1816781 |

(51) Int. Cl.
*C09K 5/04* (2006.01)

(52) U.S. Cl.
CPC ..... *C09K 5/045* (2013.01); *C09K 2205/106* (2013.01); *C09K 2205/122* (2013.01); *C09K 2205/126* (2013.01); *C09K 2205/34* (2013.01); *C09K 2205/40* (2013.01); *C09K 2205/47* (2013.01)

(58) Field of Classification Search
CPC ..... C09K 5/045; C09K 2205/106; C09K 2205/122; C09K 2205/126; C09K 2205/34; C09K 2205/40; C09K 2205/47
See application file for complete search history.

(56) References Cited

U.S. PATENT DOCUMENTS

| | | | | |
|---|---|---|---|---|
| 4,138,855 | A | 2/1979 | Jahan et al. | |
| 4,198,313 | A | 4/1980 | Bargigia et al. | |
| 4,272,960 | A | 6/1981 | Wahl, III | |
| 4,482,465 | A | 11/1984 | Gray | |
| 4,810,403 | A | 3/1989 | Bivens et al. | |
| 4,941,986 | A | 7/1990 | Jolly | |
| 4,944,890 | A | 7/1990 | Deeb et al. | |
| 5,026,497 | A | 6/1991 | Merchant | |
| 5,080,823 | A | 1/1992 | Arnaud et al. | |
| 5,108,637 | A | 4/1992 | Pearson | |
| 5,182,040 | A | 1/1993 | Bartlett et al. | |
| 5,185,094 | A | 2/1993 | Shiflett | |
| 5,304,320 | A | 4/1994 | Barthelemy et al. | |
| 5,360,566 | A | 11/1994 | Stevenson | |
| 5,370,812 | A | 12/1994 | Brown | |
| 5,417,871 | A | 5/1995 | Minor et al. | |
| 5,425,890 | A | 6/1995 | Yudin et al. | |
| 5,458,798 | A | 10/1995 | Lunger et al. | |
| 5,622,644 | A | 4/1997 | Stevenson et al. | |
| 5,624,596 | A | 4/1997 | Lunger et al. | |
| 5,626,790 | A | 5/1997 | Minor | |
| 5,672,293 | A | 9/1997 | Minor et al. | |
| 5,685,163 | A | 11/1997 | Fujita et al. | |
| 5,709,092 | A | 1/1998 | Shiflett | |
| 5,722,256 | A | 3/1998 | Shiflett | |
| 5,736,063 | A * | 4/1998 | Richard | G09K 5/045 252/67 |
| 5,785,883 | A | 7/1998 | Minor et al. | |
| 5,954,995 | A | 9/1999 | Goble | |
| 6,106,740 | A | 8/2000 | Powell et al. | |
| 6,117,356 | A | 9/2000 | Powell et al. | |
| 6,508,950 | B1 | 1/2003 | Lim et al. | |
| 6,526,764 | B1 | 3/2003 | Singh et al. | |
| 6,604,368 | B1 | 8/2003 | Powell et al. | |
| 6,606,868 | B1 | 8/2003 | Powell et al. | |
| 6,629,419 | B1 | 10/2003 | Powell et al. | |
| 6,783,691 | B1 | 8/2004 | Bivens et al. | |
| 6,991,743 | B2 | 1/2006 | Poole et al. | |
| 7,279,451 | B2 | 10/2007 | Singh et al. | |
| 7,569,170 | B2 * | 8/2009 | Minor | C09K 5/045 252/67 |
| 7,629,306 | B2 * | 12/2009 | Shankland | C09K 5/045 252/67 |
| 7,972,528 | B2 | 7/2011 | Poole et al. | |

(Continued)

FOREIGN PATENT DOCUMENTS

| | | |
|---|---|---|
| DE | 4116274 | 11/1992 |
| DE | 4116274 A1 | 11/1992 |

(Continued)

OTHER PUBLICATIONS

Examination Report mailed Apr. 15, 2013, for EP Patent Application No. 10807634.0.
International Preliminary Report on Patentability, Jun. 2, 2020, for International Patent Application No. PCT/EP2018/082583, 7 pages.
International Search Report and Written Opinion dated Mar. 21, 2022 in PCT Application No. PCT/EP2021/079297.
International Search Report mailed Jan. 16, 2015, for International Patent Application No. PCT/GB2014/053036.
Non-final Office Action, dated Apr. 27, 2021, for U.S. Appl. No. 16/764,347.
Office Action mailed Apr. 30, 2014, for Chinese Patent Application No. 201080064491.6, with English translation.

(Continued)

*Primary Examiner* — Alan D Diamond
(74) *Attorney, Agent, or Firm* — Weaver Austin Villeneuve & Sampson LLP

(57) ABSTRACT

Non-ozone depleting and non-flammable refrigerant compositions with GWPs less than 1050 which may replace HFC404A, HFC507 and HFC410A in refrigeration and air-conditioning systems.

11 Claims, No Drawings

(56) References Cited

U.S. PATENT DOCUMENTS

| | | | | |
|---|---|---|---|---|
| 8,070,355 | B2 | 12/2011 | Minor et al. | |
| 8,465,664 | B2 | 6/2013 | Poole et al. | |
| 8,551,354 | B2 | 10/2013 | Poole et al. | |
| 8,628,681 | B2 * | 1/2014 | Low | C09K 5/045 252/67 |
| 8,883,708 | B2 * | 11/2014 | Singh | C09K 5/045 510/408 |
| 8,889,031 | B2 | 11/2014 | Sawada et al. | |
| 8,974,688 | B2 * | 3/2015 | Yana Motta | C09K 5/045 252/67 |
| 9,023,231 | B2 | 5/2015 | Poole et al. | |
| 9,023,321 | B2 | 5/2015 | Poole et al. | |
| 9,062,237 | B2 | 6/2015 | Poole et al. | |
| 9,273,240 | B2 * | 3/2016 | Low | C09K 5/045 |
| 9,499,729 | B2 | 11/2016 | Williams et al. | |
| 9,624,414 | B2 | 4/2017 | Poole et al. | |
| 9,708,522 | B2 | 7/2017 | Poole et al. | |
| 9,764,999 | B2 | 9/2017 | Singh et al. | |
| 10,253,233 | B2 | 4/2019 | Poole et al. | |
| 11,459,497 | B2 | 10/2022 | Poole et al. | |
| 11,827,834 | B2 | 11/2023 | Poole et al. | |
| 2003/0001132 | A1 | 1/2003 | Lee et al. | |
| 2003/0197149 | A1 | 10/2003 | Lee et al. | |
| 2004/0016902 | A1 | 1/2004 | Lee et al. | |
| 2007/0290163 | A1 | 12/2007 | Poole et al. | |
| 2008/0230738 | A1 | 9/2008 | Minor et al. | |
| 2009/0224199 | A1 | 9/2009 | Poole et al. | |
| 2009/0242828 | A1 | 10/2009 | Poole et al. | |
| 2011/0226983 | A1 | 9/2011 | Poole et al. | |
| 2012/0312048 | A1 | 12/2012 | Poole et al. | |
| 2013/0119299 | A1 | 5/2013 | Low | |
| 2013/0193369 | A1 | 8/2013 | Low | |
| 2014/0158930 | A1 | 6/2014 | Poole et al. | |
| 2014/0216075 | A1 | 8/2014 | Singh et al. | |
| 2014/0222699 | A1 | 8/2014 | Low | |
| 2014/0331697 | A1 | 11/2014 | Minor et al. | |
| 2015/0315446 | A1 * | 11/2015 | Yana Motta | C09K 5/045 252/67 |
| 2016/0024361 | A1 | 1/2016 | Yana Motta et al. | |
| 2016/0024362 | A1 | 1/2016 | Zhili et al. | |
| 2016/0068731 | A1 | 3/2016 | Minor et al. | |
| 2016/0251556 | A1 | 9/2016 | Poole et al. | |
| 2016/0272862 | A1 * | 9/2016 | Capuciati et al. | C09K 5/045 |
| 2017/0081576 | A1 | 3/2017 | Singh et al. | |
| 2017/0152423 | A1 | 6/2017 | Poole et al. | |
| 2018/0066171 | A1 | 3/2018 | Poole et al. | |
| 2018/0264303 | A1 | 9/2018 | Robin et al. | |
| 2020/0230454 | A1 | 7/2020 | Robin et al. | |
| 2020/0317974 | A1 | 10/2020 | Poole et al. | |
| 2020/0362214 | A1 | 11/2020 | Poole et al. | |
| 2022/0162489 | A1 | 5/2022 | Poole et al. | |

FOREIGN PATENT DOCUMENTS

| | | | | |
|---|---|---|---|---|
| EP | 539952 | | 10/1992 | |
| EP | 608164 | | 7/1994 | |
| EP | 0608164 | A1 | 7/1994 | |
| EP | 659862 | | 7/1994 | |
| EP | 430169 | | 8/1994 | |
| EP | 0430169 | B1 | 8/1994 | |
| EP | 565265 | | 12/1995 | |
| EP | 0565265 | B1 | 12/1995 | |
| EP | 0539952 | B1 | 1/1996 | |
| EP | 720639 | | 6/1997 | |
| EP | 0720639 | B1 | 6/1997 | |
| EP | 779352 | | 6/1997 | |
| EP | 0779352 | A1 | 6/1997 | |
| EP | 0659862 | B1 | 6/1998 | |
| EP | 1193305 | A1 | 4/2002 | |
| EP | 509673 | | 11/2003 | |
| EP | 0509673 | B2 | 11/2003 | |
| GB | 2510322 | | 8/2014 | |
| GB | 2510322 | A | 8/2014 | |
| JP | 04-018484 | | 1/1992 | |
| JP | H0418484 | A | 1/1992 | |
| JP | 07-173462 | | 7/1995 | |
| JP | H07173462 | A | 7/1995 | |
| JP | 08-143696 | | 6/1996 | |
| JP | H08143696 | A | 6/1996 | |
| JP | 08-170074 | | 7/1996 | |
| JP | H08170074 | A | 7/1996 | |
| JP | 09-208940 | | 8/1997 | |
| JP | H09208940 | A | 8/1997 | |
| JP | 11-181414 | | 7/1999 | |
| JP | H11181414 | A | 7/1999 | |
| JP | 3226247 | U | 5/2020 | |
| WO | 92/01762 | | 2/1992 | |
| WO | WO-9201762 | A1 | 2/1992 | |
| WO | 92/11339 | | 7/1992 | |
| WO | WO-9211339 | A1 | 7/1992 | |
| WO | 92/16597 | | 10/1992 | |
| WO | WO-9216597 | A1 | 10/1992 | |
| WO | 94/26835 | | 11/1994 | |
| WO | WO-9426835 | A1 | 11/1994 | |
| WO | 95/08602 | | 3/1995 | |
| WO | WO-9508602 | A1 | 3/1995 | |
| WO | 96/03472 | A1 | 2/1996 | |
| WO | 96/03473 | | 2/1996 | |
| WO | WO-9603473 | A1 | 2/1996 | |
| WO | 97/07179 | | 2/1997 | |
| WO | WO-9707179 | A1 | 2/1997 | |
| WO | WO-9715637 | A1 | 5/1997 | |
| WO | 97/15637 | | 9/1997 | |
| WO | 98/08912 | | 3/1998 | |
| WO | WO-9808912 | A1 | 3/1998 | |
| WO | 99/36485 | | 7/1999 | |
| WO | WO-9936485 | A1 | 7/1999 | |
| WO | 2005/083028 | | 9/2005 | |
| WO | WO-2005083028 | A1 | 9/2005 | |
| WO | 2008/113984 | | 9/2008 | |
| WO | WO-2008113984 | A1 | 9/2008 | |
| WO | WO-2009089511 | A2 | 7/2009 | |
| WO | 2011/077088 | | 6/2011 | |
| WO | WO-2011077088 | A1 | 6/2011 | |
| WO | 2014/076475 | | 5/2014 | |
| WO | WO-2014076475 | A2 * | 5/2014 | C09K 5/045 |
| WO | WO-2016156812 | A1 * | 10/2016 | C09K 5/045 |
| WO | WO-2017151488 | A1 * | 9/2017 | C09K 5/045 |
| WO | WO-2019022138 | A1 | 1/2019 | |
| WO | WO-2019022139 | A1 | 1/2019 | |

OTHER PUBLICATIONS

U.S. Advisory Action dated Mar. 22, 2022 in U.S. Appl. No. 16/764,347.

U.S. Non-Final Office Action dated Nov. 10, 2022 in U.S. Appl. No. 17/451,777.

U.S. Notice of Allowance dated Aug. 8, 2023 in U.S. Appl. No. 17/451,777.

U.S. Notice of Allowance dated Jul. 19, 2023, in U.S. Appl. No. 17/451,777.

U.S. Notice of Allowance dated May 31, 2022 in U.S. Appl. No. 16/764,347.

U.S. Appl. No. 16/764,817, Inventors Poole et al. filed May 15, 2020.

U.S. Appl. No. 12/281,304, Notice of Allowance mailed Aug. 21, 2013.

U.S. Appl. No. 12/281,304, Office Action mailed Apr. 5, 2013.

U.S. Appl. No. 12/281,304, Office Action mailed Jul. 6, 2011.

U.S. Appl. No. 12/281,304, Office Action mailed Mar. 25, 2011.

U.S. Appl. No. 12/281,304, Office Action mailed May 1, 2012.

U.S. Appl. No. 12/281,304, Office Action mailed Nov. 16, 2011.

U.S. Appl. No. 12/281,304, Office Action mailed Oct. 14, 2010.

U.S. Appl. No. 12/281,306, Notice of Allowance mailed Apr. 1, 2011.

U.S. Appl. No. 12/281,306, Office Action mailed Mar. 24, 2010.

U.S. Appl. No. 12/281,306, Office Action mailed Oct. 18, 2010.

U.S. Appl. No. 13/118,304, Notice of Allowance mailed May 6, 2013.

U.S. Appl. No. 13/118,304, Office Action mailed Jun. 6, 2012.

(56) References Cited

OTHER PUBLICATIONS

U.S. Appl. No. 13/118,304, Office Action mailed Nov. 29, 2011.
U.S. Appl. No. 13/118,304, Office Action mailed Oct. 15, 2012.
U.S. Appl. No. 13/118,304, "Refrigerant Composition", Poole et al., filed May 27, 2011.
U.S. Appl. No. 13/515,798, Notice of Allowance mailed Feb. 23, 2015.
U.S. Appl. No. 13/515,798, Office Action mailed Feb. 5, 2015.
U.S. Appl. No. 13/893,179, Notice of Allowance mailed Apr. 24, 2015.
U.S. Appl. No. 13/893,179, Office Action mailed Dec. 12, 2014.
U.S. Appl. No. 13/893,179, Office Action mailed Oct. 30, 2014.
U.S. Restriction Requirement dated Aug. 5, 2022 in U.S. Appl. No. 17/451,777.
Notification Concerning Transmittal of International Preliminary Report on Patentability, dated Jun. 11, 2020, for International Patent Application No. PCT/EP2018/082583, 1 page.
International Search Report, dated Jul. 15, 2016, for International Patent Application No. PCT/GB2016/050827.
Written Opinion of the Searching Authority, dated Jul. 15, 2016, for International Patent Application No. PCT/GB2016/050827.
U.S. Appl. No. 13/893,179, Notice of Allowance dated Apr. 24, 2015.
U.S. Appl. No. 15/029,232, Non-Final Office Action, dated Sep. 13, 2016.
U.S. Appl. No. 15/029,232, Notice of Allowance, dated Jan. 5, 2017.
U.S. Appl. No. 15/029,232, Corrected Notice of Allowability, dated Mar. 20, 2017.
U.S. Appl. No. 15/431,427, Non-Final Office Action, dated Mar. 3, 2017.
U.S. Appl. No. 15/431,427, Notice of Allowance, dated Apr. 5, 2017.
U.S. Appl. No. 15/558,540, Notice of Allowance, dated Nov. 27, 2018.
Certified Priority Document, GB 1602586.08, filed Feb. 12, 2016 (Year: 2016).
International Search Report, dated May 23, 2017, for International Patent Application No. PCT/EP2018/082597, 11 pages.
Written Opinion of the Searching Authority, dated May 23, 2017, for International Patent Application No. PCT/EP2018/082597, 7 pages.
U.S. Appl. No. 16/764,817, filed May 15, 2020, Poole et al.
International Search Report, dated Dec. 2, 2019, for International Patent Application No. PCT/EP2018/082583, 3 pages.
Written Opinion of the Searching Authority, dated Dec. 2, 2019, for International Patent Application No. PCT/EP2018/082583, 6 pages.
Notification Concerning Transmittal of International Preliminary Report on Patentability, dated Jun. 11, 2020, for International Patent Application No. PCT/EP2018/082597, 1 page.
International Preliminary Report on Patentability, dated Jun. 2, 2020, for International Patent Application No. PCT/EP2018/082597, 7 pages.
Non-final Office Action, dated Jul. 22, 2021, for U.S. Appl. No. 16/764,817.
U.S. Appl. No. 13/118,304, filed May 27, 2011, Poole et al.
Combined Search Report and Examination Report under Section 17 and 18(3), dated Sep. 14, 2021, for UK Patent Application No. GB2103406.1.
Invitation to Pay Additional Fees, dated Jan. 25, 2022, in International Patent Application No. PCT/EP2021/079297.
Non-final Office Action, dated Apr. 27, 2021, for U.S. Appl. No. 16/764,347 [RFB1P042US],.
Patrial European Search Report, dated Mar. 24, 2021, in EP Application No. 20 20 3466.
U.S. Pat. U.S. Appl. No. 17/451,777, Inventors Poole et al. filed on Oct. 21, 2021 [RFB1P044US],.
U.S. Appl. No. 13/118,304, "Refrigerant Composition", Poole et al., filed May 27, 2011.(RFB1P015C1).

* cited by examiner

LOW GWP REFRIGERANT BLENDS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This invention relates to refrigerant compositions which can be used in thermal pumps to pump heat from a lower temperature to a higher temperature by the input of work. When such devices are used to generate lower temperatures, they are typically called refrigerators or air conditioners. ere they are used to produce higher temperatures, they are typically termed heat pumps. The same device may supply heating or cooling depending upon the user's requirement. This type of thermal pump may be called a reversible heat pump or reversible air conditioner.

Chlorofluorocarbons (CFCs) such as CFC-12 and R502 and hydrochlorofluorocarbons (HCFCs) such as HCFC-22 have been widely used as refrigerants, but migrate to the stratosphere where they are broken down by ultra violet light producing chlorine atoms that destroy the ozone layer. These Ozone Depleting Substances (ODS) are being replaced by non-ozone depleting alternatives such as hydrofluorocarbons (HFCs), which are non-flammable, efficient and of low toxicity. In certain applications, particularly but not specifically related to low temperature refrigeration systems often used in supermarkets, R502 was the main refrigerant of choice due largely to its lower discharge temperature compared to R22. As a consequence of the global environmental agreement to protect the Ozone Layer embodied in the Montreal Protocol, R502 was banned and was largely replaced by the HFC blends R404A and R507. However, R404A and R507, while being excellent refrigerants in terms of energy efficiency, non-flammability, low toxicity and thermodynamic properties, nevertheless have Global Warming Potentials (GWP)s which are at the high end of the commonly used HFCs.

In this specification the numerical value for a Global Warming Potential (GWP) refer to an Integrated Time Horizon (ITH) of 100 years as contained in the Inter-Governmental Panel on Climate Change Fourth Assessment Report (AR4).

Although R22, which has been widely used in air conditioning systems, has a much lower ability to destroy ozone compared to CFCs, it is being phased out under the Montreal Protocol. Non-ozone depleting R410A has proved an excellent replacement for R22 in new air-conditioning equipment, including split systems, but it is also now being phased down because the comparatively high GWP (2088) means it is no longer environmentally acceptable.

The EU and other territories have imposed GWP quotas and/or taxes to progressively reduce the availability of R404A, R507 and R410A. These actions have two key consequences. Firstly, there will be shortages of these refrigerants available to service existing equipment and charge new equipment which will disrupt the refrigeration and air conditioning industries, Secondly, the price of remaining refrigerant will rapidly increase as supply can no longer meet demand. Without replacement refrigerants, critical equipment, e.g. for preserving food in supermarkets and air-conditioning in hospitals, may stop functioning with serious social repercussions.

The composition of R404A is:

| | |
|---|---|
| R125 | 44%; |
| R143a | 52%; and |
| R134a | 4% |
| (GWP = 3922) | |

The composition of R507 is:

| | |
|---|---|
| R125 | 50%; and |
| R143a | 50% |
| (GWP = 3985) | |

The composition of R410A is:

| | |
|---|---|
| R125 | 50%; and |
| R32 | 50% |
| (GWP = 2088) | |

According to a first aspect of the present invention there is provided a refrigeration composition consisting essentially of:

| | |
|---|---|
| carbon dioxide | 1-35% |
| an HFO selected from the group consisting of: R1234yf and R1234ze(E) and mixtures thereof | 30-92% |
| R32 | 1-30% |
| R125 | 1-30% |
| R227ea | 1-15% |
| R134a | 0-15% |
| wherein the percentages are by mass and are selected from the ranges quoted to total 100%. | |

In this specification percentages or other amounts are by mass unless indicated otherwise. Amounts are selected from any ranges given to total 100%.

The term "consisting of" is used in this specification to refer to compositions which include only the recited ingredients, disregarding trace amounts of any impurities.

The term "consisting essentially of" is used in this specification to refer to compositions which consist of the recited ingredients with the possible addition of minor amounts of any further ingredients which do not substantially alter the essential refrigerant properties of the composition. These compositions include compositions which consist of the recited ingredients. Compositions which consist of the recited ingredients may be particularly advantageous.

This invention relates to low GWP blends, which particularly, but not exclusively, are compositions that can replace R404A, 8507 and R410A in existing, modified or new refrigeration and air-conditioning systems. The continued operation of existing and modified systems is facilitated. The blends have zero Ozone Depletion Potentials, so that they have no adverse effect on stratospheric ozone. The invention also provides compositions which may continue to be used in the event of progressive tightening of GWP restrictions, while minimising the cost to the user.

This invention relates particularly to refrigerant compositions that have GWP values in the range 0.5 to 1050. The values in this range are significantly lower than those of R404A, R507 and R410A. Exemplary compositions may have ASHRAE safety classifications of A1 (low toxicity/non-flammable) or A2L (low toxicity/slightly flammable).

The compositions may possess energy efficiencies and cooling capacities at least comparable to the fluids they are replacing. The compositions may have maximum operating pressures no greater than 3 bar preferably 2 bar greater at 45° C. than the refrigerants they may replace. Compositions with relatively high GWPs tend to be non-flammable (A1) while compositions with lower GWPs tend to be slightly flammable (A2L). For existing equipment there may be little scope for carrying out physical modifications. Therefore non-flammability (A1) is essential for use in existing equipment. Compositions with higher GWP values may be required. For existing equipment, where modifications are possible and especially for new installations designed to exploit their advantageous properties, then blends with lower GWPs are preferred, even if they have an A2L rating.

The term "glide" has been previously defined as the temperature difference between the bubble point and the dew point at the specified constant pressure. This may be referred to as the 'intrinsic' refrigerant glide. Defined in this way, "glide" is a purely thermodynamic property of a refrigerant and is independent of equipment and operating conditions.

In the condenser where the refrigerant moves from the dew point to the bubble point as it condenses, the observed glide is a combination of the intrinsic glide of the refrigerant plus the glide induced by the pressure drop necessary to maintain the refrigerant flow.

In an evaporator where a portion of the refrigerant has already vaporised in the expansion device for example a valve or capillary tube, a two phase mixture enters the evaporator. In this case the glide is the difference between the entry temperature and the dew point. This difference may depend on operating conditions. The observed glide will be the intrinsic glide of the refrigerant minus the glide caused by the pressure drop in the evaporator required to maintain the refrigerant flow. A measured or calculated evaporator glide under specified conditions may be used.

In this specification temperature glides under the specified operating conditions for the equipment may be classified as follows:

| | | |
|---|---|---|
| 1. | Negligible glide | less than 0.5K |
| 2. | Small glide | 0.5K to 2.0K |
| 3. | Medium glide | more than 2.0K to 5.0K |
| 4. | Wide glide | more than 5K to 10.0K |
| 5. | Very wide glide | more than 10.0K |

Compositions of the present invention may have a wide or very wide temperature glide.

Exemplary compositions may consist essentially of $CO_2$, an HFO with a normal boiling point less than −15° C., and one or more of R32, R227ea, R134a and R125. Exemplary HFOs are R1234yf and R1234ze(E). These fluids may provide a combination of appropriate vapour pressures for formulating R404A, R507 and R410A replacements with low flammability and low toxicity. They may provide compositions where the flammability of the HFOs and R32 can be partially or completely compensated for, by the presence of the non-flammable gases $CO_2$, R125 and R227ea.Furthermore, the relatively high GWPs of R125 and R227ea and the moderate GWP of R32 can be offset by the very low GWPs of $CO_2$ and the HFOs.

Exemplary embodiments of this invention provide refrigerant compositions that allow equipment to continue operating at pressures suitable for use with R404A, R507 or R410A. These embodiments provide replacement refrigerants for servicing existing equipment and charging new equipment. This object may be achieved with compositions having GWPs not exceeding 1050. Initially, a reduced EU GWP quota may provide adequate latitude for compositions in accordance with this invention having thermodynamic and flammability properties that enable them to be retrofitted into existing designs of R404A. R507 and R410A equipment with few or no modifications. This is advantageous because a retrofit composition minimises the cost to the equipment owner.

As GWP regulations further reduce the supply, it may become difficult to provide sufficient refrigerant to meet market demands using retrofit compositions. Surprisingly, we have found that compositions with GWPs less than 800, which, in themselves, do not have the thermodynamic properties to be retrofit fluids, can be used, for example, at the annual service, to top-up the refrigerant remaining in a unit containing R404A, R507 or R410A, thus enabling the equipment to continue operating, for example for at least 5 years, despite small persistent leakage. Such compositions may be termed "extenders". A further aspect of this invention is to provide an extender with GWP less than 300, which may be used as a refrigerant to service existing equipment as GWP regulations become stricter. These compositions may enable the continued use of existing technology and equipment, thereby avoiding the high cost of replacing equipment that is still functioning or the cost of developing new technologies.

While hydrocarbons, ammonia and carbon dioxide ($CO_2$) are technically feasible refrigerants for refrigeration and air-conditioning systems and have considerably lower GWPs than HFCs, they are not direct replacements for R507 and R410A, since they have inherent disadvantages which work against their general usage, particularly in public areas such as supermarkets. Highly flammable hydrocarbons can only be used safely in conjunction with a secondary refrigeration circuit, which reduces energy efficiency and increases costs, or with small charges, which severely limits the maximum cooling duty for which they can be used. Even when such safety precautions have been taken, hydrocarbon refrigerants and ammonia have caused building damage, injury and death. $CO_2$ must be used in the transcritical state on the high-pressure side of the system to allow heat rejection to ambient air. Pressures are often in excess of 100 bar, again resulting in an energy penalty and also a significantly higher capital cost compared to conventional R404A, R507 and R410A systems. Ammonia is markedly toxic. Leaks from industrial refrigeration installations may cause death and injury. Because of these adverse properties, hydrocarbons, ammonia and $CO_2$ cannot be retrofitted into existing R404A, R507 or R410A units.

Exemplary compositions have direct GWP values which are less than about 1050. GWP values are widely recorded in the literature for example as published by the US Environmental Protection Agency (EPA) or IPCC Reports.

Advantageous embodiments of this invention consist essentially of blends of carbon dioxide and R1234ze(E) and/or R1234yf, R125, R134a R227ea and R32, in the presently claimed proportions wherein the compositions have safety classifications of A1 or A2L according to ASH E Standard 34 while providing similar or superior refrigerating effects and performances as the refrigerants they are intended to replace, but with maximum operating pressures that allow them to be used with equipment components pressured rated for R404A, R507 or R410A.

Compositions of this invention may be used to completely or partially replace a refrigerant for example R404A, R410A or R507. The compositions may be used for completely retrofitting existing equipment or for topping-up existing equipment, for example following a gradual leak. Alternatively the compositions may be used as refrigerants in new or original (OEM) equipment.

In a first exemplary embodiment the composition may be used in air conditioning equipment operating at an evaporating temperature in the range about 0° C. to about 15° C., for example from about 2° C. to about 15° C., for example the equipment designed for use with R410A.

In a second exemplary embodiment the composition may be used in low temperature refrigeration equipment operating at an evaporating temperature for example from about −15° C. to about −20° C., for example with equipment designed for use with R404A or R507.

Exemplary compositions of this invention are capable of retaining the properties of the existing refrigerant when used in combination with the existing refrigerant or as a complete replacement for the existing refrigerant. The following properties may be achieved.

The GWP of the refrigerant should be lower than the GWP of the original refrigerant.

The cooling capacity of the refrigerant should be similar, for example (±20%) to that of the original refrigerant. This is important to enable the equipment to function adequately in a hot environment.

The discharge pressure should not exceed the maximum pressure rating of the equipment.

The discharge temperature should not significantly exceed the discharge temperature that the equipment is designed for. If the discharge temperature is excessive then the working life of the equipment may be reduced.

It is an advantage that the compositions in accordance with this invention may have discharge temperatures which are lower than may be expected following a standard calculation, for example using the Nist Cycle D method. Exemplary compositions may have discharge temperatures which are lower than the calculated values and for example about 5° C. to 10° C. above the measured values for R404A, R507 or R410A.

The power consumption of the equipment when using the replacement refrigerant should not be should not be significantly higher, for example more than 20% higher in comparison to the power consumption when using the original refrigerant.

Exemplary compositions may have the further advantage that they are not azeotropes or azeotrope-like. Preferred compositions boil over a temperature range greater than about 10° C., for example greater than 20° C.

It is a common belief that an azeotrope-like composition is necessary. The present inventors have unexpectedly discovered that azeotrope-like compositions are not necessary and may be disadvantageous. This discovery is particularly useful when using a direct heat exchange (DX) exchanger in which a progressive increase in temperature is dependent on the glide of the refrigerant.

In condenser equipment using a refrigerant composition in this invention the pressure drop glide is in the same direction as the refrigerant glide so that the effects are additive.

In contrast in an evaporator the pressure drop glide is in the opposite direction to the refrigerant glide so that the two effects may partially or completely cancel out. An evaporator cools, for example, an air stream or a liquid stream over a range from a higher temperature to lower temperature. If the temperature glide of the evaporating refrigerant is significantly greater than the required cooling range then the efficiency on the unit may be compromised. Preferably glide should be equal to or less that the range. Pressure-induced evaporator glide may act in opposition to the intrinsic refrigerant glide to produce an observed glide that is acceptable for a required cooling range.

In the event that the availability of high GWP R404A, R507 and R410A may be constrained by the EU F-Gas regulations, and similar global legislation following the ratification of the Kigali Amendment to the Montreal Protocol, insufficient quantities of these refrigerants may be available to service existing equipment. Major modifications of existing R404A, R507 and R410A equipment may be prohibitively expensive. The EU is limiting availability by further reducing GWP quotas to suppliers from 2018. Exemplary embodiments of this invention may overcome the quota limitation by providing refrigerants comprising an HFO, $CO_2$ and R227ea that can be used to "top-up" R404A, R507 and R410A units, allowing them to operate for at least a further five years. Typically, commercial refrigeration equipment loses 5 to 20% of its refrigerant charge each year and is topped-up with new refrigerant at its annual service. Surprisingly we have found that blends comprising carbon dioxide, R1234yf and/or R1234ze(E), R227ea, R32, R125 and optionally R134a may be added to the R404A, R507 or R410A remaining in a thermal pump after a leak to allow continued operation of the device. Such compositions are called "extenders", i.e. they extend the working life of the units to which they are added. Because most existing installations are not designed to handle flammable (A2) refrigerants, extenders are non-flammable A1 refrigerants. To ensure effective operation the compositions require suction capacities and maximum operating temperatures comparable to the refrigerants they are replacing. Preferably the GWPs of extender compositions should be less than 800 and preferably less than 300, to maximise the quantity of refrigerants available for topping up within the constraints of government imposed quotas.

According to a third aspect of this invention there is provided a refrigerant extender composition in accordance with the first aspect of this invention.

R227ea has a relatively high GWP of 3220, but is non-flammable and tends to co-distil with R1234ze(E) and R1234yf thus helping the formulation of non-flammable blends. Conversely, R32 has a lower GWP (675), but is flammable. Since non-flammable extender blends are required then it may be advantageous to omit R32 to maximise the quantity of R227ea that can be added to ensure non-flammability. For blends with a GWP not exceeding a GWP of 800 then the maximum R227ea content may be about ~24.8%; for a GWP not exceeding 500 the maximum amount of R227ea may be about 15-5%; and about for a GWP not exceeding 300 the maximum may be about 9.2%.

In embodiments the amount of R227ea may be in the range 4% to 15%.

Generally, refrigerant leaks may be small (5 to 20% per annum) allowing topping up at an annual service. But catastrophic refrigerant losses may occur when most of the charge is lost, requiring essentially a complete replacement of the original refrigerant. The compositions described above as extenders may be used for this purpose, if necessary by modifying the units to enable them to be compatible with the specific physical properties of these blends. But the compositions may result in excessive discharge temperatures in the condensers and evaporators, if systems cannot be modified. In these circumstances, compositions are preferred that have inherently acceptable discharge temperatures, suction specific volumes, an A1 safety rating and maximum operating pressures to allow them to he used in existing R404A, R507 or R410A equipment. Surprisingly we have found that this preferred combination of properties can be achieved by compositions comprising R32, R125, R1234yf, R1234ze and R227ea as claimed in this invention.

The present invention may enable the replacement of R404A, R507 and R410A, the most commonly used refrigerants in refrigeration and air-conditioning equipment, providing a substantial reduction in GWP exceeding 80% with blends having a GWP between 1 and 800 and without any reduction in performance including energy efficiency and capacity.

An exemplary refrigerant composition, may consist essentially of one of the following: carbon dioxide

| | |
|---|---|
| carbon dioxide | 5-20% |
| an HFO selected from the group consisting of: R1234yf and R1234ze(E) and mixtures thereof, | 30-92% |
| R32 | 5-30% |
| R125 | 5-30% |
| R227ea | 4-15% |
| R134a | 0-15% |

wherein the percentages are by mass and are selected from the ranges quoted to total 100%.

An exemplary refrigerant composition which may be used to completely or partially replace R404A, R507 or R410A consists or consists essentially of:

| | |
|---|---|
| R125 | 6-23% |
| carbon dioxide | 6-20% |
| R1234ze | 55-68% |
| R227ea | 6-15% |
| R32 | 6-20% |

wherein the percentages are by mass and are selected from the ranges quoted to total 100%.

An exemplary refrigerant composition which may be used to completely or partially replace R404A, R507 or R410A consists or consists essentially of:

| | |
|---|---|
| R125 | 6-20% |
| carbon dioxide | 6-18% |
| R1234ze | 55-67% |
| R227ea | 7-15% |
| R32 | 7-20% |

wherein the percentages are by mass and are selected from the ranges quoted to total 100%

An exemplary refrigerant composition may consist essentially of one of the following:

| | |
|---|---|
| R125 | 9.5% |
| carbon dioxide | 8% |
| R1234ze | 65% |
| R227ea | 8% |
| R32 | 9.5% |

wherein the percentages are by mass.

An exemplary refrigerant composition, may consist or consist essentially of one of the following:

(a)

| | |
|---|---|
| R125 | 9.5% |
| carbon dioxide | 9% |
| R1234ze | 58% |
| R227ea | 7% |
| R32 | 9.5% |
| R134a | 7% |

wherein the percentages are by mass.

(b)

| | |
|---|---|
| R125 | 11% |
| carbon dioxide | 11% |
| R1234ze | 57% |
| R227ea | 7% |
| R32 | 11% |
| R134a | 3% |

wherein the percentages are by mass.

(c)

| | |
|---|---|
| R125 | 18% |
| carbon dioxide | 11% |
| R1234ze | 44% |
| R227ea | 6% |
| R32 | 17% |
| R134a | 4% |

wherein the percentages are by mass.

(d)

| | |
|---|---|
| R125 | 11% |
| carbon dioxide | 11% |
| R1234ze | 55% |
| R227ea | 7% |
| R32 | 11% |
| R134a | 5% |

wherein the percentages are by mass.

(e)

| | |
|---|---|
| R125 | 13% |
| carbon dioxide | 11% |
| R1234ze | 53% |
| R227ea | 7% |
| R32 | 13% |
| R134a | 3% |

wherein the percentages are by mass.

(f)

| | |
|---|---|
| R125 | 13% |
| carbon dioxide | 11% |
| R1234ze | 55% |
| R227ea | 7% |
| R32 | 13% |
| R134a | 1% |

wherein the percentages are by mass.

(g)

| | |
|---|---|
| R125 | 14% |
| carbon dioxide | 11% |
| R1234ze | 51% |
| R227ea | 7% |

-continued

| | |
|---|---|
| R32 | 14% |
| R134a | 3% |

wherein the percentages are by mass.

(h)

| | |
|---|---|
| R125 | 14% |
| carbon dioxide | 11% |
| R1234ze | 55% |
| R227ea | 7% |
| R32 | 13% |
| R134a | — |

wherein the percentages are by mass.

(i)

| | |
|---|---|
| R125 | 10.5% |
| carbon dioxide | 11% |
| R1234ze | 57% |
| R227ea | 7% |
| R32 | 10.5% |
| R134a | 4% |

wherein the percentages are by mass.

(j)

| | |
|---|---|
| R125 | 10.5% |
| carbon dioxide | 11% |
| R1234ze | 58% |
| R227ea | 7% |
| R32 | 10.5% |
| R134a | 3% |

wherein the percentages are by mass.

(k)

| | |
|---|---|
| R125 | 11.5% |
| carbon dioxide | 10% |
| R1234ze | 57% |
| R227ea | 7% |
| R134a | 3% |
| R32 | 11.5% |

(l)

| | |
|---|---|
| R125 | 11.5% |
| carbon dioxide | 10% |
| R1234ze | 56% |
| R227ea | 8% |
| R32 | 11.5% |
| R134a | 3% |

An exemplary refrigerant composition, which may be used to provide a retrofit replacement, extender or new equipment alternative for R404A, R507 or R410A may consist or consist essentially of one of the following:

(a)

| | |
|---|---|
| R125 | 19% |
| carbon dioxide | 10% |
| R1234ze | 44% |
| R227ea | 3% |

-continued

| | |
|---|---|
| R32 | 17% |
| R134a | 7% |

wherein the percentages are by mass.

(b)

| | |
|---|---|
| R125 | 18% |
| carbon dioxide | 11% |
| R1234ze | 44% |
| R227ea | 7% |
| R32 | 11% |
| R134a | 3% |

wherein the percentages are by mass.

An exemplary refrigerant composition, which may be used to provide a retrofit replacement, extender or new equipment alternative for R404A, R507 or R410A may consist or consist essentially of:

| | |
|---|---|
| R125 | 1-30% |
| carbon dioxide | 1-30% |
| R1234yf | 35-70% |
| R227ea | 1-10% |
| R32 | 1-30% |
| R134a | 0-15% |

wherein the percentages are by mass and are selected from the ranges quoted to total 100%.

An exemplary refrigerant composition which may be used to provide a retrofit replacement, extender or new equipment alternative for R404A and R507 may consist or consist essentially of:

| | |
|---|---|
| R125 | 5-30% |
| carbon dioxide | 5-25% |
| R1234yf | 50-70% |
| R227ea | 2-10% |
| R32 | 5-30% |

wherein the percentages are by mass and are selected from the ranges quoted to total 100%.

An exemplary refrigerant composition, which may be used to provide a retrofit replacement, extender or new equipment alternative for R404A and R507 may consist or consist essentially of:

| | |
|---|---|
| R125 | 6-27% |
| carbon dioxide | 6-20% |
| R1234yf | 55-70% |
| R227ea | 3-10% |
| R32 | 6-27% |

wherein the percentages are by mass and are selected from the ranges quoted to total 100%.

An exemplary refrigerant composition, which may be used to provide a retrofit replacement, extender or new equipment alternative for R404A and R507 may consist or consist essentially of:

| | |
|---|---|
| R125 | 7-25% |
| carbon dioxide | 7-20% |
| R1234yf | 58-69% |
| R227ea | 5-10% |
| R32 | 7-25% |

-continued

| | |
|---|---|
| wherein the percentages are by mass and are selected from the ranges quoted to total 100%. | |

An exemplary refrigerant composition, which may be used to provide a retrofit replacement, extender or new equipment alternative for R404A and R507 may consist or consist essentially of:

| | |
|---|---|
| R125 | 7-23% |
| carbon dioxide | 7-20% |
| R1234yf | 58-68% |
| R227ea | 6-10% |
| R32 | 7-20% |
| wherein the percentages are by mass and are selected from the ranges quoted to total 100%. | |

An exemplary refrigerant composition, which may be used to provide a retrofit replacement, extender or new equipment alternative for R404A and R507 may consist or consist essentially of:

| | |
|---|---|
| R125 | 7-20% |
| carbon dioxide | 7-18% |
| R1234yf | 59-67% |
| R227ea | 7-10% |
| R32 | 7-20% |
| wherein the percentages are by mass and are selected from the ranges quoted to total 100%. | |

An exemplary refrigerant composition, which may be used to provide a retrofit replacement, extender or new equipment alternative for R404A and R507 may consist or consist essentially of:

| | |
|---|---|
| R125 | 9.5% |
| carbon dioxide | 8% |
| R1234yf | 65% |
| R227ea | 8% |
| R32 | 9.5% |

wherein the percentages are by mass.

An exemplary refrigerant composition which may be used to provide a retrofit replacement, extender or new equipment alternative for R410A may consist or consist essentially of:

| | |
|---|---|
| R125 | 9-25% |
| carbon dioxide | 7-20% |
| R1234yf | 35-60% |
| R227ea | 2-10% |
| R32 | 9-25% |
| wherein the percentages are by mass and are selected from the ranges quoted to total 100%. | |

An exemplary refrigerant composition, which may be used to provide a retrofit replacement, extender or new equipment alternative for R410A may consist or consist essentially of:

| | |
|---|---|
| R125 | 12-23% |
| carbon dioxide | 8-20% |
| R1234yf | 35-55% |
| R227ea | 3-10% |
| R32 | 12-23% |

-continued

| | |
|---|---|
| wherein the percentages are by mass and are selected from the ranges quoted to total 100%. | |

An exemplary refrigerant composition, which may be used to provide a retrofit replacement, extender or new equipment alternative for R410A may consist or consist essentially of:

| | |
|---|---|
| R125 | 19% |
| carbon dioxide | 16% |
| R1234yf | 41% |
| R227ea | 5% |
| R32 | 19% |
| wherein the percentages are by mass and are selected from the ranges quoted to total 100%. | |

An exemplary refrigerant composition, which may be used to provide an extender or new equipment alternative for R404A, R507 or R410A may consist or consist essentially of:

| | |
|---|---|
| carbon dioxide | 1-35% |
| an HFO selected from the group consisting of R1234yf and HFO1234ze(E) or mixtures thereof, and optionally, | 30-95% |
| R32 | 1-30% |
| R125 | 1-30% |
| and R227ea | 1-15% |
| and mixtures thereof, | |
| wherein the percentages are by mass and are selected from the ranges quoted to total 100%. | |

An exemplary refrigerant composition, which may be used to provide an extender or new equipment alternative for R404A, R507 or R410A may consist or consist essentially of:

| | |
|---|---|
| carbon dioxide | 10-30% |
| an HFO selected from R1234yf or R1234ze(E) or mixtures thereof | 45-85% |
| R227ea | 5-15% |
| wherein the percentages are by mass and are selected from the ranges quoted to total 100%. | |

An exemplary refrigerant composition, which may be used to provide an extender or new equipment alternative for R404A, R507 or R410A may consist or consist essentially of:

| | |
|---|---|
| carbon dioxide | 10-25% |
| an HFO selected from R1234yf or R1234ze(E) and mixtures thereof | 60-83% |
| R227ea | 5-12% |
| wherein the percentages are by mass and are selected from the ranges quoted to total 100%. | |

An exemplary refrigerant composition, which may be used to provide an extender or new equipment alternative for R404A or R507 may consist or consist essentially of:

| | |
|---|---|
| carbon dioxide | 22% |
| R227ea | 9% |
| and R1234ze(E) or R1234yf | 69% |

wherein the percentages are by mass.

An exemplary refrigerant composition, which may be used to provide an extender or new equipment alternative for R410A may consist or consist essentially of:

| | |
|---|---|
| carbon dioxide | 21-30% |
| R1234ze(E) | 60-71% |
| R227ea | 7-10% |

wherein the percentages are by mass and are selected from the ranges quoted to total 100%.

An exemplary refrigerant composition, which may be used to provide an extender or new equipment alternative for R410A may consist or consist essentially of:

| | |
|---|---|
| carbon dioxide | 25% |
| R227ea | 9% |
| and R1234ze(E) or R1234yf | 66% |

wherein the percentages are by mass.

An exemplary refrigerant composition, which may he suitable as a replacement for R404A or R507 in refrigeration equipment, may consist or consist essentially of:

| | |
|---|---|
| carbon dioxide | 10-20% |
| and an HFO selected from R1234yf and R1234ze(E) or mixtures thereof | 90-80% |

where in the percentages are by mass and are selected from the ranges quoted to total 100%

An exemplary refrigerant composition, which is suitable as a replacement for R404A or R507 in refrigeration equipment, may consist or consist essentially of:

| | |
|---|---|
| carbon dioxide | 10-30% |
| R1234ze | 70-90% |

wherein the percentages are by mass.

An exemplary refrigerant composition, which is suitable as a replacement for R404A or R507 in refrigeration equipment, may consist or consist essentially of:

| | |
|---|---|
| carbon dioxide | 15-25% |
| R1234ze | 75-90% |

wherein the percentages are by mass

An exemplary refrigerant composition, which is suitable as a replacement for R404A or R507 in refrigeration equipment, may consist or consist essentially of:

| | |
|---|---|
| carbon dioxide | 15% |
| R1234ze | 85% |

wherein the percentages are by mass

An exemplary refrigerant composition, which is suitable as a replacement for R404A or R507 in refrigeration equipment, may consist or consist essentially of:

| | |
|---|---|
| carbon dioxide | 20% |
| R1234ze | 80% |

wherein the percentages are by mass

An exemplary refrigerant composition, which is suitable as a replacement for R404A or R507 in refrigeration equipment, may consist or consist essentially of:

| | |
|---|---|
| carbon dioxide | 12-23% |
| R1234yf | 77-88% |

wherein the percentages are by mass.

An exemplary refrigerant composition, which is suitable as a replacement for R410A in air conditioning equipment, may consist or consist essentially of: carbon dioxide 12-20% and an HFO selected from R1234yf and R1234ze(E) or mixtures thereof 80-88% wherein the percentages are by mass and are selected from the ranges quoted to total 100%.

An exemplary refrigerant composition, which is suitable as a replacement for R410A in air conditioning equipment, may consist or consist essentially of:

| | |
|---|---|
| carbon dioxide | 15-23% |
| R1234yf | 77-85% |

wherein the percentages are by mass.

An exemplary refrigerant composition, which may be used to provide a retrofit replacement, extender or new equipment alternative for R404A and R507 may consist or consist essentially of:

| | |
|---|---|
| R125 | 6-23% |
| carbon dioxide | 6-20% |
| R1234ze | 55-68% |
| R227ea | 6-15% |
| R32 | 6-20% |

wherein the percentages are by mass and are selected from the ranges quoted to total 100%.

An exemplary refrigerant composition, which may be used to provide a retrofit replacement, extender or new equipment alternative for R404A and R507 may consist or consist essentially of:

| | |
|---|---|
| R125 | 6-20% |
| carbon dioxide | 6-18% |
| R1234ze | 55-67% |
| R227ea | 7-15% |
| R32 | 7-20% |

wherein the percentages are by mass and are selected from the ranges quoted to total 100%.

An exemplary refrigerant composition, which may be used to provide a retrofit replacement, extender or new equipment alternative for R404A and R507 may consist or consist essentially of:

| | |
|---|---|
| R125 | 14% |
| carbon dioxide | 11% |
| R1234ze | 55% |
| R227ea | 7% |
| R32 | 13% |

wherein the percentages are by mass.

An exemplary refrigerant composition, which may be used to provide a retrofit replacement, extender or new equipment alternative for R404A and R507 may consist or consist essentially of:

| | |
|---|---|
| R125 | 9.5% |
| carbon dioxide | 8% |
| R1234ze | 65% |
| R227ea | 8% |
| R32 | 9.5% |

wherein the percentages are by mass.

An exemplary refrigerant composition, which may be used to provide a retrofit replacement, extender or new equipment alternative for R404A and R507 may consist or consist essentially of:

| | |
|---|---|
| R125 | 9.5% |
| carbon dioxide | 9% |
| R1234ze | 57% |
| R227ea | 15% |
| R32 | 9.5% |

wherein the percentages are by mass.

An exemplary refrigerant composition, which may be used to provide a retrofit replacement, extender or new equipment alternative for R404A and R507 may consist or consist essentially of:

| | |
|---|---|
| R125 | 9.5% |
| carbon dioxide | 9% |
| R1234ze | 58% |
| R227ea | 14% |
| R32 | 9.5% |

wherein the percentages are by mass.

An exemplary refrigerant composition, which may be used to provide a retrofit replacement, extender or new equipment alternative for R410A may consist or consist essentially of:

| | |
|---|---|
| R125 | 12-23% |
| carbon dioxide | 8-20% |
| R1234ze | 35-55% |
| R227ea | 3-10% |
| R32 | 12-23% |

wherein the percentages are by mass and are selected from the ranges quoted to total 100%.

An exemplary refrigerant composition, which may be used to provide a retrofit replacement, extender or new equipment alternative for R410A may consist or consist essentially of:

| | |
|---|---|
| R125 | 19% |
| carbon dioxide | 16% |
| R1234ze | 41% |
| R227ea | 5% |
| R32 | 19% |

wherein the percentages are by mass.

An exemplary refrigerant composition, which may be used to provide a retrofit replacement, extender or new equipment alternative for R404A, R507 or R410A may consist or consist essentially of:

| | |
|---|---|
| carbon dioxide | 1-35% |
| R1234yf | 15-45% |
| R1234ze | 15-50% |

and optionally, R32, R125 and R227ea or mixtures thereof, wherein the percentages of the components, including any optional components, are by mass, and are selected from the ranges quoted to total 100%.

An exemplary refrigerant composition, which may be used to provide a retrofit replacement, extender or new equipment alternative for R404A, R507 and R410A may consist or consist essentially of:

| | |
|---|---|
| R125 | 19% |
| carbon dioxide | 16% |
| R1234ze | 20% |
| R1234yf | 21% |
| R227ea | 5% |
| R32 | 19% |

wherein the percentages are by mass.

An exemplary refrigerant composition may consist or consist essentially of:

| | |
|---|---|
| carbon dioxide | 1-35% |
| an HFO selected from R1234yf and HFO1234ze(E) or mixtures thereof, and optionally, R32, R125, R134a and R227ea or mixtures thereof, wherein the percentages of the components, are by mass, and are selected from the ranges quoted to total 100%. | 30-95% |

An exemplary refrigerant composition may consist essentially of:

| | |
|---|---|
| carbon dioxide | 1-35% |
| an HFO selected from R1234yf and HFO1234ze(E) or mixtures thereof, | 30-95% |
| and optionally, R32 | 1-30% |
| R125 | 1-30% |
| R134a | 1-30% |
| and R227ea | 1-15% |
| or mixtures thereof, wherein the percentages are by mass and are selected from the ranges quoted to total 100%. | |

An exemplary refrigerant composition, which may be used to provide a retrofit replacement, extender or new equipment alternative for R404A, R507 or R410A may consist essentially of:

| | |
|---|---|
| R125 | 1-30% |
| carbon dioxide | 1-30% |
| R1234yf | 30-70% |
| R134a | 2-30% |
| R32 | 1-30% |
| and optionally R227ea wherein the percentages are by mass and are selected from the ranges quoted tot otal 100% | 1-10% |

An exemplary refrigerant composition, which may be used to provide a retrofit replacement, extender or new equipment alternative for R410A may consist essentially of:

| | |
|---|---|
| R125 | 12-23% |
| carbon dioxide | 8-20% |
| R1234yf | 30-55% |
| R134a | 7-25% |
| R32 | 12-23% |
| and optionally R227ea | 3-10% |
| wherein the percentages are by mass and are selected from the ranges quoted to total 100%. | |

An exemplary refrigerant composition, which may be used to provide a retrofit replacement, extender or new equipment alternative for R410A may consist essentially of:

| | |
|---|---|
| R125 | 18% |
| carbon dioxide | 16% |
| R1234yf | 31% |
| R134a | 17% |
| R32 | 18% |
| wherein the percentages are by mass and total 100%. | |

An exemplary refrigerant composition, which may be used to provide an extender or new equipment alternative for R404A, R507 or R410A may consist essentially of:

| | |
|---|---|
| carbon dioxide | 1-35% |
| an HFO selected from R1234yf and R1234ze(E) or mixtures thereof, | 30-95% |
| and optionally, R32 | 1-30% |
| R125 | 1-30% |
| R134a | 1-30% |
| and optionally R227ea or mixtures thereof, | 1-10% |

wherein the percentages are by mass and are selected from the ranges quoted to total 100%.

An exemplary refrigerant composition, which may be used to provide an extender or new equipment alternative for R404A, R507 or R410A may consist essentially of:

| | |
|---|---|
| carbon dioxide | 10-30% |
| an HFO selected from R1234yf or R1234ze(E) or mixtures thereof | 30-85% |
| R134a | 3-25% |
| and optionally R227ea | 5-15% |
| wherein the percentages are by mass and are selected from the ranges quoted to total 100%. | |

An exemplary refrigerant composition, which may be used to provide a retrofit replacement, extender or new equipment alternative for R404A, R507 or R410A may consist essentially of:

| | |
|---|---|
| R125 | 1-30% |
| carbon dioxide | 1-30% |
| R1234ze | 30-70% |
| R134a | 1-30% |
| R227ea | 1-15% |
| R32 | 1-30% |
| wherein the percentages are by mass and are selected from the ranges quoted to total 100%. | |

An exemplary refrigerant composition which may he used to provide a retrofit replacement, extender or new equipment alternative for R404A and R507 may consist essentially of:

| | |
|---|---|
| R125 | 5-30% |
| carbon dioxide | 5-25% |
| R1234ze | 30-68% |
| R134a | 2-15% |
| R227ea | 2-15% |
| R32 | 5-30% |
| wherein the percentages are by mass and are selected from the ranges quoted to total 100%. | |

An exemplary refrigerant composition, which may be used to provide a retrofit replacement, extender or new equipment alternative for R404A and R507 may consist essentially of:

| | |
|---|---|
| R125 | 13% |
| carbon dioxide | 11% |
| R1234ze | 53% |
| R227ea | 3% |
| R134a | 7% |
| R32 | 13% |

wherein the percentages are by mass.

An exemplary refrigerant composition, which may be used to provide a retrofit replacement, extender or new equipment alternative for R404A and R507 may consist essentially of:

| | |
|---|---|
| R125 | 14% |
| carbon dioxide | 11% |
| R1234ze | 51% |
| R227ea | 3% |
| R134a | 7% |
| R32 | 14% |

wherein the percentages are by mass.

An exemplary refrigerant composition, which may be used to provide a retrofit replacement, extender or new equipment alternative for R404A and R507 may consist essentially of:

| | |
|---|---|
| R125 | 6-20% |
| carbon dioxide | 6-18% |
| R1234ze | 30-63% |
| R134a | 5-10% |
| R227ea | 7-15% |
| R32 | 7-20% |
| wherein the percentages are by mass and are selected from the ranges quoted to total 100%. | |

An exemplary refrigerant composition, which may he used to provide a retrofit replacement, extender or new equipment alternative for R404A and R507 may consist essentially of:

| | |
|---|---|
| R125 | 9.5% |
| carbon dioxide | 9% |
| R1234ze | 58% |
| R227ea | 7% |
| R134a | 7% |
| R32 | 9.5% |

wherein the percentages are by mass.

An exemplary refrigerant composition, which may be used to provide a retrofit replacement, extender or new equipment alternative for R404A and R507 may consist essentially of:

| | |
|---|---|
| R125 | 10.5% |
| carbon dioxide | 11% |
| R1234ze | 57% |
| R227ea | 7% |
| R134a | 4% |
| R32 | 10.5% |

wherein the percentages are by mass.

An exemplary refrigerant composition, which may be used to provide a retrofit replacement, extender or new equipment alternative for R404A and R507 may consist essentially of:

| | |
|---|---|
| R125 | 10.5% |
| carbon dioxide | 11% |
| R1234ze | 58% |
| R227ea | 7% |
| R134a | 3% |
| R32 | 10.5% |

wherein the percentages are by mass.

An exemplary refrigerant composition which may be used to provide a retrofit replacement, extender or new equipment alternative for R4 1 OA may consist essentially of:

| | |
|---|---|
| R125 | 9-25% |
| carbon dioxide | 6-20% |
| R1234ze | 30-60% |
| R134a | 2-30% |
| R227ea | 2-10% |
| R32 | 9-25% |
| wherein the percentages are by mass and are selected from the ranges quoted to total 100% | |

An exemplary refrigerant composition which may be used to provide a retrofit replacement, extender or new equipment alternative for R410A may consist essentially of:

| | |
|---|---|
| R125 | 19% |
| carbon dioxide | 10% |
| R1234ze | 44% |
| R134s | 7% |
| R227ea | 3% |
| R32 | 17% |
| wherein the percentages are by mass and are selected from the ranges quoted to total 100% | |

An exemplary refrigerant composition which may be used to provide a retrofit replacement, extender or new equipment alternative for R410A may consist essentially of:

| | |
|---|---|
| R125 | 18% |
| carbon dioxide | 11% |
| R1234ze | 44% |
| R134a | 3% |
| R227ea | 7% |
| R32 | 17% |
| wherein the percentages are by mass and are selected from the ranges quoted to total 100% | |

An exemplary refrigerant composition which may be used to provide a retrofit replacement, extender or new equipment alternative for R410A may consist essentially of:

| | |
|---|---|
| R125 | 18% |
| carbon dioxide | 11% |
| R1234ze | 44% |
| R134a | 4% |
| R227ea | 6% |
| R32 | 17% |
| wherein the percentages are by mass and are selected from the ranges quoted to total 100% | |

An exemplary refrigerant composition, which may be used to provide a retrofit replacement, extender or new equipment alternative for R410A may consist essentially of:

| | |
|---|---|
| R125 | 12-23% |
| carbon dioxide | 8-20% |
| R1234ze | 30-55% |
| R134a | 5-25% |
| R227ea | 3-10% |
| R32 | 12-23% |
| wherein the percentages are by mass and are selected from the ranges quoted to total 100% | |

An exemplary refrigerant composition, which may be used to provide a retrofit replacement, extender or new equipment alternative for R410A may consist essentially of:

| | |
|---|---|
| R125 | 12-23% |
| carbon dioxide | 8-20% |
| R1234ze | 30-55% |
| R134a | 5-25% |
| R32 | 12-23% |
| wherein the percentages are by mass and are selected from the ranges quoted to total 100% | |

An exemplary refrigerant composition, which may be used to provide a retrofit replacement, extender or new equipment alternative for R410A may consist essentially of:

| | |
|---|---|
| R125 | 13-21% |
| carbon dioxide | 10-18% |
| R1234ze | 30-45% |
| R134a | 8-20% |
| R32 | 13-20% |
| wherein the percentages are by mass and are selected from the ranges quoted to total 100% | |

An exemplary refrigerant composition, which may be used to provide a retrofit replacement, extender or new equipment alternative for R410A may consist essentially of:

| | |
|---|---|
| R125 | 18% |
| carbon dioxide | 16% |
| HFO-1234ze | 31% |
| R134a | 17% |
| R32 | 18% |
| wherein the percentages are by mass and are selected from the ranges quoted to total 100% | |

An exemplary refrigerant composition, which may be used to provide a retrofit replacement, extender or new equipment alternative for R404A, R507 or R410A may consist essentially of:

| | |
|---|---|
| carbon dioxide | 1-35% |
| R1234yf | 15-45% |

-continued

| | |
|---|---|
| HFO-1234ze<br>and optionally, R32, R125, R134a and R227ea or mixtures thereof, wherein the percentages of the components, including any optional components, are by mass, and are selected from the ranges quoted to total 100%. | 15-50% |

Although the above blends described as top-up blends for existing R404A, R507 and R410A units, they can also be used as compete replacements in some instances, if necessary by modifying the units to enable them to be compatible with the specific physical properties of these blends.

The present invention enables the replacement of R404A, R507 and R410A, the most commonly used refrigerants in refrigeration and air-conditioning equipment, providing a substantial reduction in GWP exceeding 80% with blends having a GWP between 1 and 500, and without any reduction in performance including energy efficiency and capacity.

Each blend that is the subject of this invention may be used in a thermal pump lubricated by an oxygen containing oil, for example POE or PAG, or by such oils mixed with a hydrocarbon lubricant up to 50%, for example a mineral oil, alkyl benzene or polyalpha olefin.

Each blend that is the subject of this invention may be used in a thermal pump lubricated by an oxygen containing oil, for example POE or PAG, or by such oils mixed with a hydrocarbon lubricant up to 50%, for example a mineral oil, alkyl benzene and polyalpha olefin.

The invention is further described by means of examples but not in any limitative sense.

Example 1

Refrigerant compositions shown in Table 1 were assessed as replacements for R410A in existing and new equipment.

TABLE 1

| Refrigerant # | Chemical name | R410A | Blend 1 | Blend 2 |
|---|---|---|---|---|
| R125 | pentafluoroethane | 50 | 18.7 | 18 |
| R134a | 1, 1, 1, 2-tetrafluoroethane | 0 | 7.4 | 4.2 |
| R744 | carbon dioxide | 0 | 10.3 | 10.9 |
| R1234yf | 2, 3, 3, 3-tetrafluoroprop-1-ene | 0 | 0 | 0 |
| R227ea | 1, 1, 1, 3, 3 ,3-hexafluoropropane | 0 | 3 | 5.8 |
| R1234ze (E) | E-1, 3, 3, 3-tetrafluoroprop-1-ene | 0 | 43.3 | 43.8 |
| R32 | difluoromethane | 50 | 17.2 | 17.4 |
| GWP | | 2088 | | |

A Toshiba reversible, split air-conditioning unit, Model RAS-137SAV-E3, containing 0.8 kg R410A was used to cool a room and monitored using temperature and pressure sensors positioned as indicated in FIG. 1 with a current meter to record the compressor electric power consumption. Data collected is shown in Table 2a.

(I(A) is the current in amps consumed by the compressor.

T1 is the sensor located in the airstream leaving the evaporator.

T2 is the sensor located within in the room.

T3 is the sensor located in the airstream at the condenser outlet.

T4 is the sensor located in the airstream entering the condenser.

T5 is the sensor located on the refrigerant discharge from the compressor.

P1 is the suction pressure of the compressor.

TABLE 2a

| Refrigerant: R410A Mode: Cooling | | | | | | | |
|---|---|---|---|---|---|---|---|
| T1 (° C.) | T2 (° C.) | T3 (° C.) | T4 ( C.) | T5 (° C.) | P1 (barg) | I (A) | Time (min) |
| 31 | 28.2 | 27.1 | 26.3 | 45.7 | 14.39 | 0.18 | 0 |
| 16.4 | 27.2 | 34.6 | 26.9 | 49.1 | 8.5 | 3.22 | 5 |
| 14.5 | 26.4 | 34 | 27.6 | 50.5 | 8.8 | 3.29 | 10 |
| 12.8 | 25.9 | 35.2 | 28.7 | 49.8 | 8.5 | 3.35 | 15 |
| 11.9 | 25.6 | 34.6 | 28.5 | 48.5 | 8.3 | 3.37 | 20 |
| 11 | 25.3 | 34.6 | 28.6 | 48.4 | 8 | 3.39 | 25 |
| 10.5 | 25.1 | 34.4 | 28.8 | 48.7 | 7.9 | 3.34 | 30 |

The R410A was replaced by 0.8 kg of Blend 1 with the composition shown in Table 1 and the device again run to cool the room. The data collected is shown in Table 2b.

TABLE 2b

| Refrigerant: Blend 1 Mode: Cooling | | | | | | | |
|---|---|---|---|---|---|---|---|
| T1 (° C.) | T2 (° C.) | T3 (° C.) | T4 (° C.) | TS (° C.) | P1 (barg) | I (A) | Time (min) |
| 27.7 | 27.9 | 28.6 | 26.5 | 27.6 | 11.85 | 0 | 0 |
| 20 | 26.9 | 29.1 | 27.3 | 41.5 | 3.66 | 4 | 5 |
| 14.9 | 25.9 | 32.4 | 29.2 | 52.6 | 5.72 | 2.95 | 10 |
| 13.9 | 25.5 | 31.6 | 28.8 | 53.7 | 5.72 | 2.9 | 15 |
| 13.5 | 25.3 | 31.6 | 28.6 | 53.5 | 5.61 | 2.87 | 20 |
| 13.1 | 25.2 | 32.3 | 28.9 | 53.4 | 5.55 | 2.9 | 25 |
| 12.8 | 25 | 32.1 | 29.3 | 53.2 | 5.46 | 2.98 | 30 |
| 12.5 | 24.9 | 31.9 | 29 | 53.1 | 5.41 | 2.93 | 35 |

Blend 1 was then removed from the device which was then recharged with 0.8 kg of Blend 2. The device was again to cool the room and the data collected is shown in Table 1 c.

TABLE 2c

| Refrigerant: Blend 2 Mode Cooling | | | | | | | |
|---|---|---|---|---|---|---|---|
| T1 (° C.) | T2 (° C.) | T3 (° C.) | T4 ( C.) | T5 (° C.) | P1 (barg) | I (A) | Time (min) |
| 30 | 29.8 | 31.3 | 29.6 | 39.2 | 13.58 | 0 | 0 |
| 17.6 | 28.2 | 32.5 | 30 | 55.2 | 5.6 | 4.4 | 5 |
| 14.7 | 27.3 | 34.3 | 30.2 | 57.6 | 5.33 | 4.43 | 10 |
| 13.8 | 26.9 | 34.6 | 30.6 | 57.5 | 5.15 | 4.42 | 15 |
| 13.1 | 26.5 | 34.6 | 30.5 | 57.9 | 4.97 | 4.39 | 20 |
| 12.3 | 26.2 | 34.5 | 30.8 | 58.1 | 4.86 | 4.36 | 25 |
| 12 | 26 | 34.8 | 31.8 | 58.7 | 4.81 | 4.43 | 30 |

The data shows that both Blend 1 and Blend 2 are effective retrofit replacements for R410 in a typical split air conditioning unit. Blend 1 is especially preferred because it has a lower current consumption and thus a lower power consumption than R410A. In other words, Blend 1 is more efficient than R410A.

Example 2

Refrigerant compositions containing R1234ze(E) and R1234yf, shown in Table 2, were assessed as potential replacements for R410A in air conditioning units by modelling their performances using cycle simulations based on thermodynamic data generated by NIST's REFPROP v10. The results demonstrated that Blends 3 to 6 are acceptable replacements for R41 OA. Flow rates were similar so that the capillary expansion tubes commonly found in smaller split air conditioning units will continue to operate properly, thus avoiding costly modifications. The maximum operating pressures, which occurred in the condenser, were not more than 2 bar greater than that of R410A under comparable conditions, which is within the typical rating of a split air-conditioning unit. The discharge temperatures were 15° C. or less above that of R410A, avoiding thea nal decomposition of lubricants or damage to other components. The GWPs of the blends were all less than 1000, so 1 tonne of a blend can replace more than 2 tonnes of R410A and remain within the EU imposed GWP cap.

TABLE 3

| | | R410A | Blend 3 | Blend 4 | Blend 5 | Blend 6 |
|---|---|---|---|---|---|---|
| R125 | | 0.5 | 19 | 18 | 17 | 17 |
| R134a | | 0 | 7 | 4 | 10 | 14 |
| R744 | | 0 | 10 | 11 | 11 | 11 |
| R1234yf | | 0 | 0 | 0 | 22 | 41 |
| R227ea | | 0 | 3 | 6 | 3 | 0 |
| R1234zeE | | 0 | 44 | 44 | 22 | 0 |
| R32 | | 0.5 | 17 | 17 | 17 | 17 |
| | | 2088 | 980 | 998 | 952 | 912 |
| Input Parameters | | | | | | |
| Cooling duty | kW | 1 | 1 | 1 | 1 | 1 |
| Condenser | | | | | | |
| Midpoint | C. | 45 | 51 | 51 | 51 | 50 |
| Subcool | kJ/kg | 5 | 5 | 5 | 5 | 5 |
| External air temperature | C. | 35 | 35 | 35 | 35 | 35 |
| Evaporator | | | | | | |
| Midpoint | C. | 7 | 15 | 15 | 15 | 15 |
| Superheat | C. | 5 | 5 | 5 | 5 | 5 |
| Compressor | | | | | | |
| Isentropic efficiency | | 0.7 | 0.7 | 0.7 | 0.7 | 0.7 |
| Electric motor efficiency | | 0.9 | 0.9 | 0.9 | 0.9 | 0.9 |
| Volumetric efficiency | | 0.9 | 0.9 | 0.9 | 0.9 | 0.9 |
| Output Results | | | | | | |
| Condenser | | | | | | |
| Pressure | bara | 27.30 | 26.33 | 27.02 | 28.31 | 29.30 |
| Dew point | C. | 45.06 | 60.29 | 60.76 | 59.19 | 57.11 |
| Bubble point | C. | 44.94 | 41.71 | 41.24 | 42.81 | 42.89 |
| Mid point | C. | 45 | 51 | 51 | 51 | 50 |
| Glide | K | 0.1 | 18.6 | 19.5 | 16.4 | 14.2 |
| Exit temperature | C. | 39.9 | 36.7 | 36.2 | 37.8 | 37.9 |
| Heat out | kW | 1.30 | 1.34 | 1.34 | 1.35 | 1.34 |
| Evaporator | | | | | | |
| Pressure | bara | 9.93 | 7.88 | 8.08 | 8.69 | 9.45 |
| Entry temperature | C. | 6.96 | 1.46 | 0.97 | 2.40 | 3.38 |
| Dew point | C. | 7.04 | 16.54 | 17.03 | 15.60 | 14.62 |
| Mid point | C. | 7 | 9 | 9 | 9 | 9 |
| Glide | K | 0.1 | 15.1 | 16.1 | 13.2 | 11.2 |
| Exit temperature | C. | 12.0 | 21.5 | 22.0 | 20.6 | 19.6 |
| Heat in | kW | 1 | 1 | 1 | 1 | 1 |
| Compressor | | | | | | |
| Entry temperature to casing | C. | 12.0 | 21.5 | 22.0 | 20.6 | 19.6 |
| Entry temperature to compressor | C. | 25.7 | 38.3 | 38.9 | 36.6 | 34.5 |
| Discharge temperature | C. | 82.4 | 96.5 | 97.3 | 94.2 | 90.6 |
| Compression ratio | | 2.7 | 3.3 | 3.3 | 3.3 | 3.1 |
| Total power input | kW | 0.30 | 0.34 | 0.34 | 0.35 | 0.34 |
| Swept volume | m^3/h | 0.65 | 0.78 | 0.77 | 0.74 | 0.70 |
| System | | | | | | |
| Suction specific volume | kJ/m^3 | 4960 | 4135 | 4224 | 4356 | 4622 |
| COP cooling | | 3.32 | 2.95 | 2.94 | 2.89 | 2.95 |
| Mass flow rate | kg/s | 0.00613 | 0.00622 | 0.00622 | 0.00655 | 0.00673 |

Example 3

Refrigerant composition blend 7 shown in Table 4 was assessed as a replacement for R404A in existing unit.

TABLE 4

| Refrigerant # | Chemical name | R410A | Blend 7 |
|---|---|---|---|
| R125 | Pentafluoroethane | 44 | 11.4 |
| R134a | 1, 1, 1, 2-tetrafluoroethane | 4 | 3.3 |
| R143a | 1, 1, 1-trifluoroethane | 52 | 0 |
| R744 | carbon dioxide | 0 | 10.4 |
| R1234yf | 2, 3, 3, 3-tetrafluoroprop-1-ene | 0 | 0 |
| R227ea | 1, 1, 1, 3, 3, 3-hexafluoropropane | 0 | 7.4 |
| R1234ze (E) | E-1, 3, 3 ,3-tetrafluoroprop-1-ene | 0 | 56.1 |
| R32 | Difluoromethane | 0 | 11.4 |
| GWP | | 2088 | 733 |

Testing a composition in an actual unit may take several days to assess the performance. Initial screening of candidates is therefore typically carried out by using a computer program to model the Rankine refrigeration cycle using as input the thermodynamic properties of the composition and important operating parameters to generate key performance criteria as output. This type of program is widely employed throughout the refrigeration industry. The performances of R404A and Blend 7 were modelled under similar conditions typical of a commercial refrigeration freezer cabinet with a cycle model using NIST's REFPROP v10 providing thermodynamic data. Since Blend 7 has very wide temperature glides in the evaporator and condenser the midpoint temperatures of the glide ranges were selected to be representative of the evaporating and condensing temperatures. The input and output parameters are summarised in Table 5.

TABLE 5

| Input | | R404A | Blend 7 |
|---|---|---|---|
| Cooling duty | kW | 1 | 1 |
| Condenser | | | |
| Midpoint | 35 | 35 | |
| Subcool | kJ/kg | 5 | 5 |
| Evaporator | | | |
| Midpoint | C | −35 | −35 |
| Superheat | C | 10 | 10 |
| Compressor | | | |
| Isentropic efficiency | | 0.7 | 0.7 |
| Electric motor efficiency | | 0.9 | 0.9 |
| Output | | | |
| Condenser | | | |
| Pressure | bara | 16.1 | 16.4 |
| Dew | point | C | 47.5 |
| Bubble point | C | 34.8 | 22.5 |
| Midp9int | C | 35 | 35 |
| Glide | K | 0.4 | 25.1 |
| Exit temperature | C | 29.8 | 17.5 |
| Evaporator | | | |
| Pressure | bara | 1.65 | 1.19 |
| Entry temperature | C | −35.2 | −41.8 |
| Dewpoint | C | −3478 | −28.2 |
| Midpoint | C | −35 | −35 |
| Glide | K | 0.49 | 13.5 |
| Exit temperature | C | −24.8 | −18.2 |
| Heat in | kW | 1 | 1 |

TABLE 5-continued

| Input | | R404A | Blend 7 | |
|---|---|---|---|---|
| Compressor | | | | |
| Entry temperature to casing | C | −24.8 | −18.2 | |
| Entry temperature to compressor | C | −15.0 | −4.3 | |
| Discharge temperature | C | 83.0 | 121.4 | 38.4 |
| Compression ratio | | 9.8 | 13.8 | |
| Total power input | kW | 0.73 | 0.70 | |
| Swept volume | m^3/h | 4.10 | 4.53 | |
| System | | | | |
| Suction specific volume | kJ/m^3 | 790.7 | 715.5 | 90.5 |
| COP cooling | | 1.4 | 1.4 | |
| Mass flow rate | kg/s | 0.00898 | 0.00615 | 68.4 |

Although Blend 7 has much lower GWP than R404A and its maximum (discharge) pressure is acceptable as a retrofit for R404A, the model results indicated that the performance of Blend 7 was inferior to R404A in certain key respects.

The compressor discharge temperature is 38.4° C. higher for Blend 7 than for R404A which would seriously reduce reliability and operating life of the compressor. The mass flow rate of Blend 7 is 68.4% lower than for R404A, so, for a freezer or other refrigeration unit with a fixed capillary tube expansion device, the flow rate of Blend 7 would be too large, potentially flooding the evaporator which might result in too high an evaporation temperature and also flooding of the evaporator risking liquid returning to the compressor, which might cause damage.

The very wide evaporator glide of 13.5 K would result in the evaporator refrigerant exit temperature (−18.4° C.) being above the maximum temperature needed to needed to maintain frozen food below −18° C.

The very wide condenser glide of Blend 7 (25.1 K) resulted in a condenser exit temperature of 17.5° C. compared to 29.9° C. for R404A. On the basis that the exit temperature needed to be at least approximately 5 K above the ambient air temperature to for adequate heat transfer from the refrigerant to the air, than R404A may be cooled by ambient air at 25° C. and below, while Blend 7 would only work if the ambient temperature was below 12° C., an unrealistic value for a commercial freezer cabinet in a supermarket.

The calculated suction cooling capacity of Blend 7 was only 68.4%. This indicated that R404A, would not be able to reach and maintain food in the required temperature range of −23° C. to −18° C., especially at high ambient. The calculations predicted that Blend 7 could not be a retrofit replacement for R404A. Surprisingly we have found that Blend 7 is a good retrofit for R404A in a real unit. Contrary to what is predicted using the conventional calculations.

An AHT freezer display cabinet, Model Paris 250(-) type LE228, containing 0.276 kg R404A, was loaded with 182 kg of ice contained in 50×1.5 L, 1×3 L and 13×8 L plastic bottles to simulate a typical freezer contents. The freezer was run until it reached and maintained a steady temperature as recorded by its in-built temperature sensor. The ambient air temperature, the compressor gas discharge temperature, the suction pressure, the discharge pressure, the suction gas temperature just before the compressor and the current draw by the unit were also measured. The results are recorded in Table 6 after the freezer had been operating for 29.7 hours.

The R404A was then replaced by a similar weight of Blend 7 and the results recorded after 29.8 hours of operation

TABLE 6

| | | R404A | Blend 7 |
|---|---|---|---|
| Room temperature | ° C. | 14.2 | 14.0 |
| Refrigerant suction temperature | ° C. | 16.8 | 17.0 |
| Refrigerant discharge temperature | ° C. | 68.9 | 71.1 |
| Freezer temperature (unit thermostat) | ° C. | −25.5 | −28.0 |
| Temperature top of freezer | ° C. | −22.0 | −21.2 |
| Suction pressure | barg | −0.02 | 0.13 |
| Discharge pressure | barg | 11.8 | 14.1 |
| Current draw | amp | 2.39 | 2.66 |
| Running time | hour | 29.7 | 29.8 |

The results show that Blend 7 is able to maintain the freezer temperature at or below below its design rating of −18 to −23° C. achieved with R404A. The fact that Blend 7 is maintaining a lower temperature than R404A indicates that it has a better cooling capacity than R404A and thus will be acceptable for high ambient temperatures.

Surprisingly the discharge temperature of Blend 7 was only 2.2° C. higher than that of R404A, in contrast to the much greater difference predicted from the model calculation. Although the current draw (a measure of the electrical power input) is about 11% higher for Blend 7 this is acceptable. The operating period of 29.8 hours showed that Blend 7 had reached a steady state and there was no indication of malfunctioning that might be associated with a flooded evaporator problem.

Example 4

The performances of Blends 8 to 12, whose compositions are shown in Table 7, were modelled for a typical low temperature refrigeration system using a Rankine Cycle program with thermodynamic data generated by NIST's REFPROP v10. The perfoiinance of R404A is included for comparison. The results in Table 7 indicate that these novel blends are acceptable replacements for retrofitting in R404A equipment.

TABLE 7

| Component | | Blend 8 | Blend 9 | Blend 10 | Blend 11 | Blend 12 |
|---|---|---|---|---|---|---|
| R125 | | 0.11 | 0.13 | 0.12 | 0.14 | 0.14 |
| R143a | | 0 | 0 | 0 | 0 | 0 |
| R134a | | 0.03 | 0.03 | 0.05 | 0.03 | 0.05 |
| carbon dioxide | | 0.11 | 0.11 | 0.09 | 0.11 | 0.11 |
| R1234yf | | 0 | 0 | 0.3 | 0 | 0.48 |
| R227ea | | 0.07 | 0.07 | 0.05 | 0.07 | 0.08 |
| R1234ze | | 0.57 | 0.53 | 0.28 | 0.51 | 0 |
| R32 | | 0.11 | 0.13 | 0.11 | 0.14 | 0.14 |
| GWP | | 701 | 777 | 690 | 816 | 872 |
| Results | | | | | | |
| Input | | | | | | |
| Cooling duty | kW | 1 | 1 | 1 | 1 | 1 |
| Condenser | | | | | | |
| Midpoint | C. | 35 | 35 | 35 | 35 | 35 |
| Subcool | K | 5 | 5 | 5 | 5 | 5 |
| Evaporator | | | | | | |
| Midpoint | C. | −35 | −35 | −35 | −35 | −35 |
| Superheat | C. | 5 | 5 | 5 | 5 | 5 |
| Compressor | | | | | | |
| Isentropic efficiency | | 0.7 | 0.7 | 0.7 | 0.7 | 0.7 |
| Electric motor efficiency | | 0.9 | 0.9 | 0.9 | 0.9 | 0.9 |
| Volumetric efficiency | | 0.9 | 0.9 | 0.9 | 0.9 | 0.9 |
| Output | | | | | | |
| Condenser | | | | | | |
| Pressure | bara | 16.6 | 17.3 | 17.1 | 17.6 | 20.1 |
| Dew point | C. | 47.9 | 47.4 | 45.3 | 47.1 | 44.5 |
| Bubble point | C. | 22.1 | 22.6 | 24.7 | 22.9 | 25.5 |
| Mid point | C. | 35 | 35 | 35 | 35 | 35 |
| Glide | K | 25.7 | 24.8 | 20.5 | 24.3 | 19.0 |
| Exit temperature | C. | 17.1 | 17.6 | 19.7 | 17.9 | 20.5 |
| Evaporator | | | | | | |
| Pressure | bara | 1.20 | 1.28 | 1.34 | 1.32 | 1.74 |
| Entry temperature | C. | −42.0 | −42.1 | −40.3 | −42.1 | −40.2 |
| Dew point | C. | −28.0 | −27.9 | −29.7 | −27.9 | −29.8 |
| Mid point | C. | −35 | −35 | −35 | −35 | −35 |
| Glide | K | 13.93 | 14.20 | 10.63 | 14.26 | 10.48 |
| Exit temperature | C. | 23.0 | 22.9 | 24.7 | 22.9 | 24.8 |
| Compressor | | | | | | |
| Entry temperature to casing | C. | −23.0 | −22.9 | −24.7 | −22.9 | −24.8 |
| Entry temperature to compressor | C. | −9.3 | −9.0 | −12.0 | −8.9 | −12.1 |
| Discharge temperature | C. | 116.2 | 117.8 | 106.2 | 118.5 | 107.5 |
| Compression ratio | | 13.8 | 13.4 | 12.7 | 13.3 | 11.6 |
| Total power input | kW | 0.70 | 0.71 | 0.71 | 0.71 | 0.73 |
| Swept volume | m^3/h | 4.49 | 4.26 | 4.27 | 4.16 | 3.49 |

TABLE 7-continued

| Component | | Blend 8 | Blend 9 | Blend 10 | Blend 11 | Blend 12 |
|---|---|---|---|---|---|---|
| System | | | | | | |
| Suction specific volume | kJ/m^3 | 721 | 760 | 759 | 779 | 927 |
| COP cooling | | 1.42 | 1.42 | 1.40 | 1.41 | 1.37 |
| Mass flow rate | kg/s | 0.00626 | 0.00623 | 0.00687 | 0.00622 | 0.00701 |

The invention claimed is:

1. A nonflammable, zeotropic refrigerant composition, consisting essentially of one of the following compositions *wherein percentages are by mass*:

[(a)]

| | |
|---|---|
| R125 | 9.5% |
| carbon dioxide | 9% |
| R1234ze(*E*) | 58% |
| R227ea | 7% |
| R32 | 9.5% |
| R134a | 7% |

[wherein the percentages are by mass] ;

[(b)]

| | |
|---|---|
| R125 | 11% |
| carbon dioxide | 11% |
| R1234ze(*E*) | 57% |
| R227ea | 7% |
| R32 | 11% |
| R134a | 3% |

[wherein the percentages are by mass] ;

[(c)]

| | |
|---|---|
| R125 | 18% |
| carbon dioxide | 11% |
| R1234ze(*E*) | 44% |
| R227ea | 6% |
| R32 | 17% |
| R134a | 4% |

[wherein the percentages are by mass] ;

[(d)]

| | |
|---|---|
| R125 | 11% |
| carbon dioxide | 11% |
| R1234ze(*E*) | 55% |
| R227ea | 7% |
| R32 | 11% |
| R134a | 5% |

[wherein the percentages are by mass] ;

[(e)]

| | |
|---|---|
| R125 | 13% |
| carbon dioxide | 11% |
| R1234ze(*E*) | 53% |
| R227ea | 7% |
| R32 | 13% |
| R134a | 3% |

[wherein the percentages are by mass] ;

[(f)]

| | |
|---|---|
| R125 | 13% |
| carbon dioxide | 11% |
| R1234ze(*E*) | 55% |
| R227ea | 7% |
| R32 | 13% |
| R134a | 1% |

[wherein the percentages are by mass] ;

[(g)]

| | |
|---|---|
| R125 | 14% |
| carbon dioxide | 11% |
| R1234ze(*E*) | 51% |
| R227ea | 7% |
| R32 | 14% |
| R134a | 3% |

[wherein the percentages are by mass] ;

[(i)]

| | |
|---|---|
| R125 | 10.5% |
| carbon dioxide | 11% |
| R1234ze(*E*) | 57% |
| R227ea | 7% |
| R32 | 10.5% |
| R134a | 4% |

[wherein the percentages are by mass] ;

[(j)]

| | |
|---|---|
| R125 | 10.5% |
| carbon dioxide | 11% |
| R1234ze(*E*) | 58% |
| R227ea | 7% |
| R32 | 10.5% |
| R134a | 3% |

[wherein the percentages are by mass] ;

[(k)]

| | |
|---|---|
| R125 | 11.5% |
| carbon dioxide | 10% |
| R1234ze(*E*) | 57% |
| R227ea | 7% |
| R32 | 11.5% |
| R134a | 3% |

[wherein the percentages are by mass] ;

| [(l)] | |
|---|---|
| R125 | 11.5% |
| carbon dioxide | 10% |
| R1234ze(*E*) | 56% |
| R227ea | 8% |
| R32 | 11.5% |
| R134a | 3% |

[wherein the percentages are by mass] *; and*

| | |
|---|---|
| *R125* | *14%* |
| *carbon dioxide* | *11%* |
| *R1234ze(E)* | *55%* |
| *R227ea* | *7%* |
| *R32* | *13%* |
| *R134(a)* | *0%.* |

2. A nonflammable, zeotropic refrigerant [corn position] *composition,* consisting essentially of one of the following compositions *wherein percentages are by mass*:

| [(a)] | |
|---|---|
| R125 | 19% |
| carbon dioxide | 10% |
| R1234ze(*E*) | 44% |
| R227ea | 3% |
| R32 | 17% |
| R134a | 7%; |

[wherein the percentages are by mass] ;

| [(b)] | |
|---|---|
| R125 | 18% |
| carbon dioxide | 11% |
| R1234ze(*E*) | 44% |
| R227ea | 7% |
| R32 | 17% |
| R134a | 3% |

[wherein the percentages are by mass] ; and

| [(c)] | |
|---|---|
| R125 | 18% |
| carbon dioxide | 11% |
| R1234ze(*E*) | 44% |
| R227ea | 6% |
| R32 | 17% |
| R134a | 4% |

[wherein the percentages are by mass] .

*3. A refrigerant composition, consisting essentially of one of the following compositions wherein percentages are by mass:*

| | |
|---|---|
| *R125* | *18.7%* |
| *carbon dioxide* | *10.3%* |
| *R1234ze(E)* | *43.3%* |
| *R227ea* | *3%* |
| *R32* | *17.2%* |
| *R134a* | *7.4%;* |

| | |
|---|---|
| *R125* | *18%* |
| *carbon dioxide* | *10.9%* |
| *R1234ze(E)* | *43.8%* |
| *R227ea* | *5.8%* |
| *R32* | *17.4%* |
| *R134a* | *4.2%;* |

| | |
|---|---|
| *R125* | *19%* |
| *carbon dioxide* | *10%* |
| *R1234ze(E)* | *44%* |
| *R227ea* | *3%* |
| *R32* | *17%* |
| *R134a* | *7%;* |

| | |
|---|---|
| *R125* | *18%* |
| *carbon dioxide* | *11%* |
| *R1234ze(E)* | *44%* |
| *R227ea* | *6%* |
| *R32* | *17%* |
| *R134a* | *7%;* |

| | |
|---|---|
| *R125* | *17%* |
| *carbon dioxide* | *11%* |
| *R1234ze(E)* | *22%* |
| *R1234yf* | *22%* |
| *R227ea* | *3%* |
| *R32* | *17%* |
| *R134a* | *10%;* |

| | |
|---|---|
| *R125* | *17%* |
| *carbon dioxide* | *11%* |
| *R1234ze(E)* | *0%* |
| *R1234yf* | *41%* |
| *R227ea* | *0%* |
| *R32* | *17%* |
| *R134a* | *14%;* |

| | |
|---|---|
| *R125* | *11.4%* |
| *carbon dioxide* | *10.4%* |
| *R1234ze(E)* | *56.1%* |
| *R227ea* | *7.4%* |
| *R32* | *11.4%* |
| *R134a* | *3.3%;* |

| | |
|---|---|
| *R125* | *11%* |
| *carbon dioxide* | *11%* |
| *R1234ze(E)* | *57%* |
| *R227ea* | *7%* |
| *R32* | *11%* |
| *R134a* | *3%;* |

| | |
|---|---|
| *R125* | *13%* |
| *carbon dioxide* | *11%* |
| *R1234ze(E)* | *53%* |
| *R227ea* | *7%* |
| *R32* | *13%* |
| *R134a* | *3%;* |

| | |
|---|---|
| *R125* | *12%* |
| *carbon dioxide* | *9%* |
| *R1234ze(E)* | *28%* |
| *R1234yf* | *30%* |

-continued

| | |
|---|---|
| R227ea | 5% |
| R32 | 11% |
| R134a | 5%; |

| | |
|---|---|
| R125 | 14% |
| carbon dioxide | 11% |
| R1234ze(E) | 51% |
| R227ea | 7% |
| R32 | 14% |
| R134a | 3%; and |

| | |
|---|---|
| R125 | 14% |
| carbon dioxide | 11% |
| R1234ze(E) | 0% |
| R1234yf | 48% |
| R227ea | 8% |
| R32 | 14% |
| R134a | 5%. |

*4. The refrigerant composition of claim 3, wherein the composition is nonflammable.*

*5. The refrigerant composition of claim 4, wherein the composition is zeotropic.*

*6. The refrigerant composition of claim 3, wherein the refrigerant composition has a GWP not exceeding 1050.*

*7. A refrigerant composition, consisting essentially of one of the following compositions:*

| | |
|---|---|
| carbon dioxide | 9-11% |
| an HFO selected from the group consisting of R1234yf and R1234ze(E) and mixtures thereof | 40-60% |
| R32 | 10-20% |
| R125 | 10-20% |
| R227ea | 0-8% |
| R134a | 3-14% |

*wherein the percentages are by mass and are selected from the ranges quoted to total 100%.*

*8. The refrigerant composition of claim 7, wherein the composition is nonflammable.*

*9. The refrigerant composition of claim 8, wherein the composition is zeotropic.*

*10. The refrigerant composition of claim 7, wherein the refrigerant composition has a GWP not exceeding 1050.*

*11. A refrigerant composition having a GWP not exceeding 1050, consisting essentially of:*

| | |
|---|---|
| carbon dioxide | 1-30% |
| R1234ze(E) | 30-70% |
| R32 | 1-30% |
| R125 | 1-30% |
| R227ea | 1-15% |
| R134a | 1-30% |

*wherein the percentages are by mass and are selected from the ranges quoted to total 10%.*

* * * * *